US012699397B2

(12) United States Patent
Lopez et al.

(10) Patent No.: US 12,699,397 B2
(45) Date of Patent: Aug. 4, 2026

(54) STATE ESTIMATION METHOD FOR MOBILE ROBOT NAVIGATION

(71) Applicant: NingboTech University, Ningbo (CN)

(72) Inventors: Eduardo Espindola Lopez, Ningbo (CN); Yu Tang, Ningbo (CN); Jun Qiu, Ningbo (CN)

(73) Assignee: NingboTech University, Ningbo (CN)

( * ) Notice: Subject to any disclaimer, the term of this patent is extended or adjusted under 35 U.S.C. 154(b) by 69 days.

(21) Appl. No.: 18/938,014

(22) Filed: Nov. 5, 2024

(65) Prior Publication Data

US 2026/0079494 A1 Mar. 19, 2026

(30) Foreign Application Priority Data

Sep. 19, 2024 (CN) ......................... 202411303383.X

(51) Int. Cl.
| | |
|---|---|
| *G05D 1/00* | (2024.01) |
| *G05D 1/24* | (2024.01) |
| *G05D 111/50* | (2024.01) |

(52) U.S. Cl.
CPC ............ *G05D 1/24* (2024.01); *G05D 2111/52* (2024.01)

(58) Field of Classification Search
CPC .... G05D 1/24; G05D 2111/52; G01C 21/165; G01C 21/20; G06F 17/16
See application file for complete search history.

(56) References Cited

U.S. PATENT DOCUMENTS

| | | | | |
|---|---|---|---|---|
| 2022/0066466 A1* | 3/2022 | Nishida | ............... | G06N 3/0499 |
| 2022/0179102 A1* | 6/2022 | McDaniel | ............... | G01S 19/47 |

FOREIGN PATENT DOCUMENTS

| | | | | | |
|---|---|---|---|---|---|
| CN | 104155909 A | * | 11/2014 | | |
| CN | 104197927 A | * | 12/2014 | ............. | G01C 21/20 |
| CN | 108731664 B | * | 8/2020 | ............. | G01C 21/16 |

* cited by examiner

*Primary Examiner* — Russell Frejd
*Assistant Examiner* — Brittany Renee Peko
(74) *Attorney, Agent, or Firm* — Getech Law LLC; Jun Ye

(57) ABSTRACT

A state estimation method for mobile robot navigation is provided which includes: step S1, initializing the processing module, and then controlling the field-programmable gate array to obtain measurement values of a moment k collected by the inertial measurement unit and the localization apparatus in a constant sampling period; step S2, controlling the application-specific integrated circuit to send the measurement values to the processing module; step S3, controlling the processing module to, based on the measurement values, sequentially perform vector padding, additional inertial vector acquisition, normalization processing, alignment error computation, filter measurement value computation, bias estimation value computation, velocity estimation value computation, pose estimation value computation and orthogonalization processing to obtain state estimation values of the moment k; step S4, controlling the processing module to send the state estimation values to the human-machine interface for visual display.

10 Claims, 2 Drawing Sheets

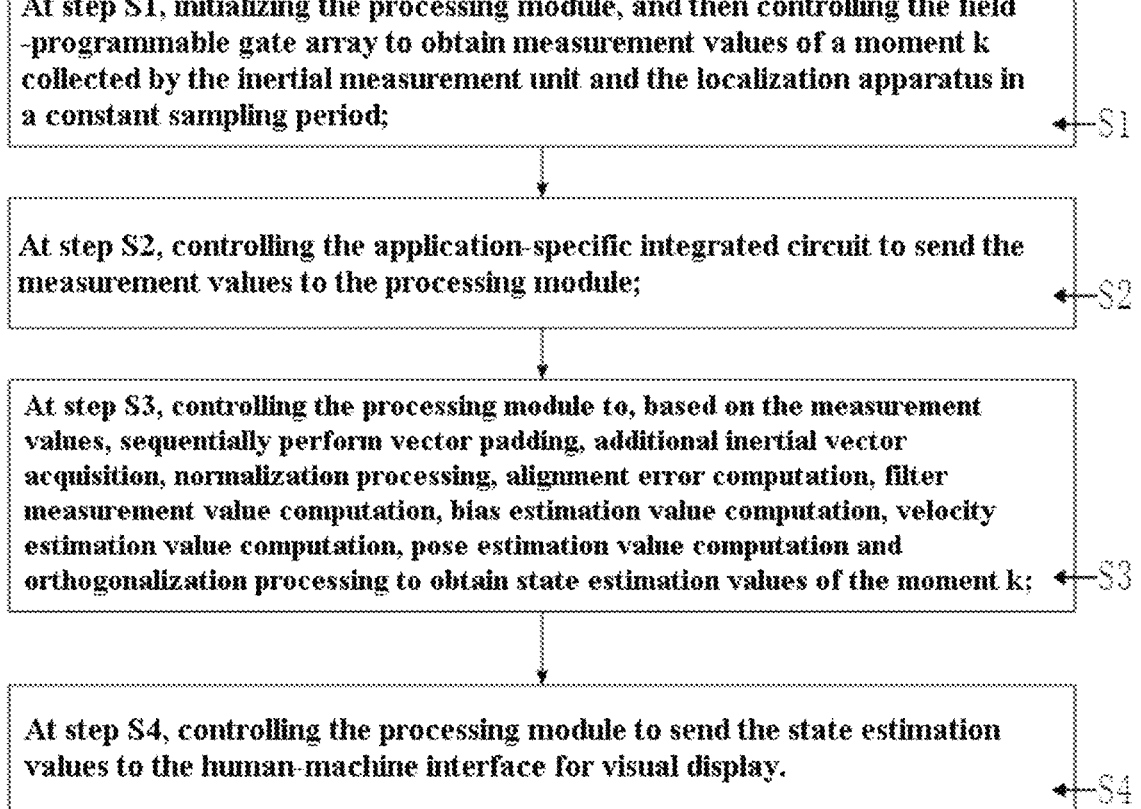

At step S1, initializing the processing module, and then controlling the field-programmable gate array to obtain measurement values of a moment k collected by the inertial measurement unit and the localization apparatus in a constant sampling period; ←S1

At step S2, controlling the application-specific integrated circuit to send the measurement values to the processing module; ←S2

At step S3, controlling the processing module to, based on the measurement values, sequentially perform vector padding, additional inertial vector acquisition, normalization processing, alignment error computation, filter measurement value computation, bias estimation value computation, velocity estimation value computation, pose estimation value computation and orthogonalization processing to obtain state estimation values of the moment k; ←S3

At step S4, controlling the processing module to send the state estimation values to the human-machine interface for visual display. ←S4

FIG.1

STATE ESTIMATION METHOD FOR MOBILE ROBOT NAVIGATION

TECHNICAL FIELD

The present disclosure relates to the technical field of robot state analysis, and in particular to a state estimation method for mobile robot navigation.

BACKGROUND

At present, most sensors for autonomous mobile robot navigation are independent platforms which usually provide pose measurements (orientation and position) contaminated by noises and sensor biases. In fact, the orientation is usually estimated from Inertial Measurement Unit (IMU) by using mathematic algorithms, and these algorithms filter noises in the process. Among them, the Kalman filter is the most popular. The position is measured by some indoor/outdoor platforms, such as GPS, vision camera, ultrawideband system (UWB) and ultrasonic sensor and the like. Besides, in the autonomous robot applications, a translational velocity and an angular velocity are also measured to make feedback control. Traditionally, these measurements are obtained by Doppler or laser radar sensors, and these sensors also may add the noises and biases.

At present, the IMUs and localizing apparatuses are combined to obtain a feasible state (orientation, position, angular velocity and translational velocity) estimation method. Due to multiple long-iteration algorithms (such as neural network, data-driven method or extended Kalman filter), excessive computation time and memory are required. Other methods with low computation costs only estimate some states, for example, some complementary filters compute the biases in the pose estimation and angular velocity measurement, and some known non-linear filters estimate the pose and translational velocity. They cannot provide accurate complete state estimation and also have measurement noises and sensor biases.

SUMMARY

In order to overcome the defects in the prior arts (or related arts), the present disclosure provides a complete state estimation method for mobile robot navigation. The technical problem to be addressed by the present disclosure is to provide accurate and complete state estimation, so as to reduce measurement noises and correct sensor biases.

In the state estimation method provided by the present disclosure, it is required to mount and fix an inertial measurement unit and a localization apparatus on a mobile robot in advance, and the mobile robot is configured in advance with a field-programmable gate array, an application-specific integrated circuit and a processing module. The field-programmable gate array is respectively in communication with the inertial measurement unit and the localization apparatus; the application-specific integrated circuit is respectively in communication with the field-programmable gate array and the processing module; and the processing module is in communication with a human-machine interface. The state estimation method includes the following steps:

at step S1, initializing the processing module, and then controlling the field-programmable gate array to obtain measurement values of a moment k collected by the inertial measurement unit and the localization apparatus in a constant sampling period;

at step S2, controlling the application-specific integrated circuit to send the measurement values to the processing module;

at step S3, controlling the processing module to, based on the measurement values, sequentially perform vector padding, additional inertial vector acquisition, normalization processing, alignment error computation, filter measurement value computation, bias estimation value computation, velocity estimation value computation, pose estimation value computation and orthogonalization processing to obtain state estimation values of the moment k;

at step S4, controlling the processing module to send the state estimation values to the human-machine interface for visual display.

Compared with the prior arts, the state estimation method for mobile robot navigation according to the present disclosure has the following advantages:

In the present disclosure, the initialization of the processing module and the collection and acquisition of the measurement values are performed in the step S1; transmission of the measurement values is carried out in the step S2; the computation of the state estimation values such as direction, position, angular velocity and translational velocity is performed in the step S3; visual display for the state estimation values is performed in the step S4 to provide accurate and complete state estimation. The computation of the state estimation values includes vector padding, additional inertial vector acquisition, normalization processing, alignment error computation, filter measurement value computation, bias estimation value computation, velocity estimation value computation, pose estimation value computation and orthogonalization processing, so as to reduce measurement noises and correct sensor biases.

In one possible implementation, the step S1 of performing vector padding includes the following steps: padding the following vectors based on the measurement values of the moment k:

$$p(k) = [\, p_x(k) \quad p_y(k) \quad p_z(k) \,]^T$$

$$gyr(k) = [\, gyr_x(k) \quad gyr_y(k) \quad gyr_z(k) \,]^T$$

$$v\_1(k) = [\, acc_x(k) \quad acc_y(k) \quad acc_z(k) \,]^T$$

$$v\_2(k) = [\, mag_x(k) \quad mag_y(k) \quad mag_z(k) \,]^T$$

$$v\_i(k) = [\, v\_i_x(k) \quad v\_i_y(k) \quad v\_i_z(k) \,]^T; \text{ for } i = 4, 5, \ldots, n$$

determining whether an odometer is present in the localization apparatus;

if yes, padding the following vectors:

$$vel(k) = [\, vel_x(k) \quad vel_y(k) \quad vel_z(k) \,]^T;$$

if not, by using an accelerometer, measuring and computing the translational velocity and padding the following vectors:

$$vel(k) = vel(k) + \frac{a\_bdy(k-1) + a\_bdy(k)}{2} T_s$$

-continued $$a\_bdy(k) = acc(k) - (R\_est(k))^T g$$

where p(k), gyr(k), vel(k) and acc(k) represent the vectors of the inertial measurement unit and the localization apparatus at the moment k, v_i(k) represents the inertial vector of the moment k, v_1(k) represents a first inertial vector of the moment k, v_2(k) represents a second inertial vector of the moment k, R_est(k) represents a $$K\_f(k) = -$$

$$\sum_{i=1}^{n} k\_i \begin{bmatrix} 0.0 & -(vf\_i(k))_z & (vf\_i(k))_y \\ (vf\_i(k))_z & 0.0 & -(vf\_i(k))_x \\ -(vf\_i(k))_y & (vf\_i(k))_x & 0.0 \end{bmatrix} \begin{bmatrix} 0.0 & -(v\_i(k))_z & (v\_i(k))_y \\ (v\_i(k))_z & 0.0 & -(v\_i(k))_x \\ -(v\_i(k))_y & (v\_i(k))_x & 0.0 \end{bmatrix}$$

$$v\_aux(k) = k\_w(gm\_f) \sum_{i=1}^{n} k\_i(vf\_i(k)) \times v\_i(k)$$

direction estimation value of the moment k, and $T_s$ represents the constant sampling period.

In one possible implementation, the step S3 of obtaining the additional inertial vector includes the following steps:

padding a third inertial vector of the moment k, where the third inertial vector is represented by:

$$v\_3(k) = [ (v\_1(k) \times v\_2(k))_x \quad (v\_1(k) \times v\_2(k))_y \quad (v\_1(k) \times v\_2(k))_z ]^T.$$

In one possible implementation, the step S3 of performing normalization processing in the following formula:

$$v\_i = \left[ \frac{v\_i_x}{\|v\_i\|} \quad \frac{v\_i_y}{\|v\_i\|} \quad \frac{v\_i_z}{\|v\_i\|} \right]^T; \text{ for } i = 1, 2, \dots, n$$

where v_i represents an after-normalization vector.

In one possible implementation, the step S3 of performing alignment error computation in the following formula:

$$z(k) = \sum_{i=1}^{n} k\_i(v\_i(k)) \times ((R\_est(k))^T r\_i(k))$$

where z(k) represents an alignment error, k_i represents a scalar gain, ranging between 0 and 1, and r_i(k) represents a pre-obtained inertial reference vector of the moment k.

In one possible implementation, the step S3 of computing the filter measurement value in includes the following steps:

introducing a first-order linear filter, where the first-order linear filter is expressed as below:

$$vpf\_i(k) = gm\_f(v\_i(k) - vf\_i(k)), \text{ for } i = 1, 2, \dots, n$$

then, by using numerical integration method, obtaining a filter version of each inertial vector:

$$vf\_i(k) = vf\_i(k) + \frac{vpf\_i(k-1) + vpf\_i(k)}{2} T_s$$

where vf_i(k) represents the filter version of each inertial vector at the moment k, and gm_f represents a gain of the first-order linear filter.

In one possible implementation, the step S3 of computing the bias estimation value in includes the following steps: computing a necessary variable for bias estimation:

where k_w represents a preset design parameter corresponding to the angular velocity error;

then, performing dynamic computation on pre-bias estimation value of the moment k:

$$bwbp(k) = k\_wK\_f(k)(gyr(k) - bw\_est(k)) + v\_aux(k) - z(k)$$

$$bvbp(k) = k\_v(vel(k) - bv\_est(k)) -$$

$$k\_v(w\_est(k)) \times ((R\_est(k))^T p(k)) + (R\_est(k))^T (p\_est(k) - p(k))$$

where k_v represents a preset design parameter corresponding to the translational velocity, bwbp(k) and bvbp(k) represent auxiliary variables at the moment k, p_est(k) represents a position estimation value of the moment k, and w_est(k) represents the angular velocity estimation value of the moment k;

then, based on trapezoidal rule, obtaining by computation:

$$bwb(k) = bwb(k) + \frac{bwbp(k-1) + bwbp(k)}{2} T_s$$

$$bvb(k) = bvb(k) + \frac{bvbp(k-1) + bvbp(k)}{2} T_s$$

then, performing computation on the bias estimation value:

$$bw\_est(k) = bwb(k) + k\_w \sum_{i=1}^{n} k\_i(vf\_i(k)) \times v\_i(k)$$

$$bv\_est(k) = bvb(k) - k\_v(R\_est(k))^T p(k)$$

where bw_est(k) represents the bias estimation value corresponding to the angular velocity at the moment k, and bv_est(k) represents the bias estimation value corresponding to the translational velocity at the moment k.

In one possible implementation, the step S3 of performing computation on the velocity estimation value includes the following steps:

computing the velocity estimation value:

$$w\_est(k) = (k\_z)z(k) + gyr(k) - bw\_est(k)$$

$$v\_est(k) = -k\_p(R\_est(k))^T(p\_est(k) - p(k)) -$$

$$k\_z\big((R\_est(k))^T p\_est(k)\big) \times z(k) + vel(k) - bv\_est(k)$$

where k_z represents a preset design parameter corresponding to the direction, v_est(k) represents a translational velocity estimation value of the moment k, k_p represents a preset design parameter corresponding to the position; then, performing computation on the velocity estimation value transmitted to the human-machine interface:

$$wb\_est(k) = gyr(k) - bw\_est(k)$$

$$vb\_est(k) = vel(k) - bv\_est(k)$$

where wb_est(k) represents the angular velocity estimation value transmitted to the human-machine interface, and vb_est(k) represents the translational velocity estimation value transmitted to the human-machine interface.

In one possible implementation, the step S3 of performing computation on the pose estimation value includes the following steps:

establishing an auxiliary matrix:

$$V\_est(k) = \begin{bmatrix} 0.0 & -(w\_est(k))_z & (w\_est(k))_y & (v\_est(k))_x \\ (w\_est(k))_z & 0.0 & -(w\_est(k))_x & (v\_est(k))_y \\ -(w\_est(k))_y & (w\_est(k))_x & 0.0 & (v\_est(k))_z \\ & 0.0_{1\times3} & & 0.0 \end{bmatrix}$$

then, performing matrix multiplication computation:

$$gp\_est(k) = g\_est(k)V\_est(k)$$

then, by numerical integration method, obtaining the pose estimation value by computation:

$$g\_est(k) = g\_est(k) + \frac{gp\_est(k-1) + gp\_est(k)}{2}T_s$$

where g_est(k) represents the pose estimation value;
then, performing computation on the direction estimation value and the position estimation value:

$$R\_est(k) = g\_est(k).[1{:}3,1{:}3]$$

$$p\_est(k) = g\_est(k).[1{:}3,4].$$

In one possible implementation, the step S3 of performing orthogonalization processing includes:

before the direction estimation value is transmitted to the human-machine interface, performing orthogonalization process to enable the matrix of the direction estimation values to have orthogonality condition, then, using the angular velocity estimation value wb_est(k), the translational velocity estimation value vb_est(k), the direction estimation value R_est(k), and the position estimation value p_est(k) at the moment k as the state estimation values.

BRIEF DESCRIPTIONS OF THE DRAWINGS

FIG. 1 is a flowchart illustrating the steps of the present disclosure.

DETAILED DESCRIPTIONS OF EMBODIMENTS

Figure 2:
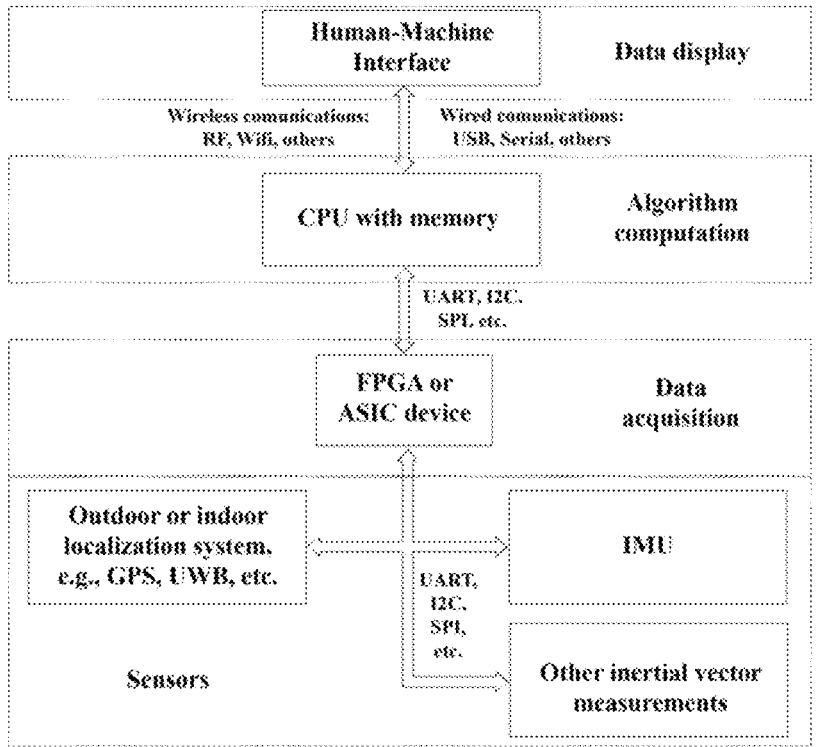
FIG. 2 is a schematic diagram illustrating module connection of the present disclosure.

Firstly, those skilled in the arts should understand that these embodiments are used only to interpret the technical principle of the embodiments of the present disclosure rather than to limit the scope of protection of the present disclosure. Those skilled in the arts can make adjustment to them based on requirements to adapt to the specific application scenarios.

The present disclosure will be further detailed below in combination with drawings and specific embodiments.

With reference to FIG. 1, one or more embodiments of the present disclosure provide a state estimation method for mobile robot navigation, which includes:

at step S1, initializing a processing module, and then controlling a field-programmable gate array to obtain measurement values of a moment k collected by an inertial measurement unit (IMU) and a localization apparatus in a constant sampling period;

at step S2, controlling an application-specific integrated circuit to send the measurement values to the processing module;

at step S3, controlling the processing module to, based on the measurement values, sequentially perform vector padding, additional inertial vector acquisition, normalization processing, alignment error computation, filter measurement value computation, bias estimation value computation, velocity estimation value computation, pose estimation value computation and orthogonalization processing to obtain state estimation values of the moment k;

at step S4, controlling the processing module to send the state estimation values to the human-machine interface for visual display.

With reference to FIG. 1, the measurement values are obtained from the IMU with a three-axis magnetometer, a three-axis accelerometer and a three-axis gyro, and the localization apparatus with a three-axis position measurement and a three-axis velocity measurement. Therefore, for each 16-bit measurement value, the desired information of a total of 240 bits is to be received. When the translational velocity measurement is absent, the proposed method may be used by filtering the accelerometer data. Further, the proposed method may fuse multiple inertial vector measurements from the magnetometer and accelerometer to improve the estimation accuracy and the robustness for the faults of the sensors.

With reference to FIG. 2, the sensors in the present disclosure include: an IMU providing the measurement value, where the IMU includes one three-axis accelerometer, one three-axis magnetometer, and one three-axis gyro; and one localization apparatus providing three-axis position; and one three-axis odometer as an option. The data collection is carried out by using a field-programmable gate array (FPGA) or an application-specific integrated circuit (ASIC). These devices collect data from the two sensors while maintaining communication with the two sensors at different frequencies based on different communication protocols (e.g. I2C, SPI and the like). These functions significantly reduce the pose estimation time.

With continuous reference to FIG. 2, once the data is collected by the FPGA in a constant sampling period, the data will be sent to the processing module based on some communication protocols (I2C, SPI, UART and the like) with the application-specific integrated circuit. This processing module is composed of a Central Processing Unit (CPU) with a memory (e.g. microcontroller, or digital signal processor (DSP)). In this processing module, computation estimation algorithm is applied to generate a result, i.e. state estimation values, which are transmitted to the human-machine interface (HMI) displaying the results. The HMI is a Personal Computer (PC), and the communication between the HMI and the processing module may be wireless, for example, WiFi or Radio Frequency (RF) platform, or may be wired, for example, USB, serial communication and Ethernet and the like.

With continuous reference to FIG. 1, when the processing module is initialized in the step S1, it is required to perform initialization on the following vectors and matrices especially at the moment 0:

$$a\_bdy(0) = [\,0.0 \quad 0.0 \quad 0.0\,]^T;$$

$$v\_aux(0) = [\,0.0 \quad 0.0 \quad 0.0\,]^T;$$

$$bwbp(0) = [\,0.0 \quad 0.0 \quad 0.0\,]^T;$$

$$bvbp(0) = [\,0.0 \quad 0.0 \quad 0.0\,]^T;$$

$$bwp(0) = [\,0.0 \quad 0.0 \quad 0.0\,]^T;$$

$$bvp(0) = [\,0.0 \quad 0.0 \quad 0.0\,]^T;$$

$$bw\_est(0) = [\,0.0 \quad 0.0 \quad 0.0\,]^T;$$

$$bv\_est(0) = [\,0.0 \quad 0.0 \quad 0.0\,]^T;$$

$$vb\_est(0) = [\,0.0 \quad 0.0 \quad 0.0\,]^T;$$

$$wb\_est(0) = [\,0.0 \quad 0.0 \quad 0.0\,]^T;$$

$$v\_est(0) = [\,0.0 \quad 0.0 \quad 0.0\,]^T;$$

$$w\_est(0) = [\,0.0 \quad 0.0 \quad 0.0\,]^T;$$

$$p\_est(0) = [\,0.0 \quad 0.0 \quad 0.0\,]^T;$$

$$R\_est(0) = \begin{bmatrix} 1.0 & 0.0 & 0.0 \\ 0.0 & 1.0 & 0.0 \\ 0.0 & 0.0 & 1.0 \end{bmatrix};$$

$$K\_f(0) = \begin{bmatrix} 0.0 & 0.0 & 0.0 \\ 0.0 & 0.0 & 0.0 \\ 0.0 & 0.0 & 0.0 \end{bmatrix};$$

$$g\_est(0) = \begin{bmatrix} R\_est & p\_est \\ 0.0_{1\times3} & 1.0 \end{bmatrix};$$

$$gp\_est(0) = \begin{bmatrix} 0.0_{3\times3} & 0.0_{3\times1} \\ 0.0_{1\times3} & 0.0 \end{bmatrix};$$

$$V\_est(0) = \begin{bmatrix} 0.0_{3\times3} & 0.0_{3\times1} \\ 0.0_{1\times3} & 0.0 \end{bmatrix};$$

where the symbol $0.0\_(n\times m)$ represents a matrix of n rows and m columns with zero elements, for example, g_est is a 4×4 matrix, and the variables bwbp and bvbp are auxiliary variables. Further, v_est, w_est, p_est and R_est respectively represent the estimation values of the translational velocity, the angular velocity, the position and the direction, R_est must be a rotational matrix, namely, it must satisfy the orthogonality condition: the determinant is equal to 1, and its inverse matrix must satisfy $R\_est^{\wedge}(-1)=R\_est^{\wedge}T$.

With continuous reference to FIG. 1, during the initialization, it is also required to perform initialization on the vectors of the IMU and the localization apparatus:

$$acc(0) = [\,0.0 \quad 0.0 \quad 0.0\,]^T;$$

$$mag(0) = [\,0.0 \quad 0.0 \quad 0.0\,]^T;$$

$$gyr(0) = [\,0.0 \quad 0.0 \quad 0.0\,]^T;$$

$$vel(0) = [\,0.0 \quad 0.0 \quad 0.0\,]^T;$$

$$p(0) = [\,0.0 \quad 0.0 \quad 0.0\,]^T;$$

Likewise, it is also required to perform initialization on the inertial vector, its filter version, inertial reference vector and other auxiliary vectors:

$$v\_i(0) = [\,0.0 \quad 0.0 \quad 0.0\,]^T;$$

$$vf\_i(0) = [\,0.0 \quad 0.0 \quad 0.0\,]^T;$$

$$r\_i(0) = [\,0.0 \quad 0.0 \quad 0.0\,]^T;$$

$$vpf\_i(0) = [\,0.0 \quad 0.0 \quad 0.0\,]^T; \text{ for } i = 1,2, \dots , n;$$

where n is a number of the inertial vectors, including the vectors of the accelerometer and the magnetometer.

With continuous reference to FIG. 1, during the initialization, it is also required to perform initialization on the following constants and design parameters:

$$k\_i = 0.1; \text{ for } i = 1,2, \dots , n,$$

$$k\_v = 0.1;$$

$$k\_p = 2.0;$$

$$k\_w = 1.0;$$

$$k\_z = 10.0;$$

$$gm\_f = 1000.0;$$

$$g = [\,0.0 \quad 0.0 \quad -9.81\,]^T;$$

where the scalar gain k_i ranges between 0 and 1; selection is performed based on a signal to noise ratio (SNR) in the measurement of the corresponding inertial vector, for example, if the accelerometer measures the v_1 SNR to be low, a small weight k_1=0.1 is assigned; if the magnetometer measures v_2 SNR to be high, k_2=0.8 can be selected and so on; the preset design parameters k_p, k_z, k_v and k_w are respectively associated with the error of the position, direction, translational velocity and angular velocity; the constant gm_f is the gain of the first-order linear filter of the inertial vector measurement, and the selection is large enough to satisfy the condition:

$$gm\_f > \omega_{MAX}/\epsilon_f$$

where $\omega_{MAX} < \infty$ is a bandwidth of the system (radian/second) and $\epsilon\_f \in (0,1)$ is an amount of free selection, which is associated with the amplitude of the transfer function of the first-order linear filter; finally, the constant g is a gravitational acceleration, which must be defined based on the direction of the accelerometer and the positive direction of its axis. In the present method, it is supposed that the accelerometer measures the gravitational acceleration along the negative Z axis.

With continuous reference to FIG. 1, when this method is used for the first time in the new geographical area, and the calibration sub-program of the processing module is used to obtain the inertial reference vector in the following steps: 1) the entire system modules are maintained as stationary and facing toward zero angle on each axis, and connected and prepared to receive data; 2) the measurement data is received from the accelerometer, magnetometer and other inertial measurement devices for a sufficient length of time to obtain the data within the acceptable change level; 3) the inertial reference vector is computed as below:

$$r\_1 = \left[ \begin{array}{ccc} \dfrac{acc_x}{\|acc\|} & \dfrac{acc_y}{\|acc\|} & \dfrac{acc_z}{\|acc\|} \end{array} \right]^T;$$

$$r\_2 = \left[ \begin{array}{ccc} \dfrac{mag_x}{\|mag\|} & \dfrac{mag_y}{\|mag\|} & \dfrac{mag_z}{\|mag\|} \end{array} \right]^T;$$

$$r\_3 = \left[ \begin{array}{ccc} \dfrac{(r\_1 \times r\_2)_x}{\|r\_1 \times r\_2\|} & \dfrac{(r\_1 \times r\_2)_y}{\|r\_1 \times r\_2\|} & \dfrac{(r\_1 \times r\_2)_z}{\|r\_1 \times r\_2\|} \end{array} \right]^T;$$

$$r\_i = \left[ \begin{array}{ccc} \dfrac{v\_i_x}{\|v\_i\|} & \dfrac{v\_i_y}{\|v\_i\|} & \dfrac{v\_i_z}{\|v\_i\|} \end{array} \right]^T; \text{ for } i = 4,5, \ldots , n;$$

where the symbol x represents a cross product of the vectors, and the data from the accelerometer and the magnetometer and other inertial measurement data are arranged as below:

$$acc = [\, acc_x \quad acc_y \quad acc_z \,]^T;$$

$$mag = [\, mag_x \quad mag_y \quad mag_z \,]^T;$$

$$v\_i = [\, v\_i_x \quad v\_i_y \quad v\_i_z \,]^T;$$

After all inertial reference vectors are obtained, the following constant matrix is computed:

$$W = -\sum_{i=1}^{n} k\_i \left[ \begin{array}{ccc} 0.0 & -r\_i_z & r\_i_y \\ r\_i_z & 0.0 & -r\_i_x \\ -r\_i_y & r\_i_x & 0.0 \end{array} \right]^2$$

where $r\_i=[r\_i_x \; r\_i_y \; r\_i_z]$, and thus the gain k\_i is adjusted to satisfy the following condition:

$$\lambda_m = \lambda_{min}(W^2) - \lambda_{min}(W)\lambda_{max}(W) > 0;$$

where $\lambda\_min$ (·) and $\lambda\_max$ (·) respectively represent minimum and maximum feature values of the matrix; then, after the constant $$\lambda_o = \sum_{i=1}^{n} k\_i(1 - \epsilon_f)$$

other preset design parameters is:

$$k\_p > 0.0; \; k\_v > 0.0;$$

$$k\_w > \frac{p_M^2}{4\lambda_o k\_p};$$

$$k\_z > \max\left\{ \frac{1}{\lambda_m \lambda_o k\_w}, \gamma_1, \gamma_2 \right\};$$

$$\gamma_1 = \frac{4\lambda_o p_M^2(k\_p)^2 k\_w + 4k\_p - 4p_M^2 k\_p}{\lambda_m(4\lambda_o k\_p k\_w - p_M^2)};$$

$$\gamma_2 = \frac{4p_M k\_p k\_w \lambda_o(2v_M k\_v + p_M k\_p k\_v + p_M)}{k\_v \lambda_m(4\lambda_o k\_p k\_w - p_M^2)} +$$

$$\frac{4k\_p k\_v(\lambda_o v_M^2 k\_v k\_w + 1)}{k\_v \lambda_m(4\lambda_o k\_p k\_w - p_M^2)} -$$

$$\frac{p_M^2(p_M^2 + v_M^2(k\_v)^2 + 2p_M v_M k\_v + 4k\_p k\_v)}{k\_v \lambda_m(4\lambda_o k\_p k\_w - p_M^2)};$$

where p\_M and v\_M are maximum position and translational velocity obtained from the measurement values during calibration. These conditions are sufficient to ensure the state estimation is converged to actual state, and in order to obtain better performance, different preset design parameter setting can be tested during the process.

With continuous reference to FIG. 1, in the step S3, the data acquisition process involves obtaining the measurement values at the moment k to pad the following vectors:

$$p(k) = [\, p_x(k) \quad p_y(k) \quad p_z(k) \,]^T;$$

$$gyr(k) = [\, gyr_x(k) \quad gyr_y(k) \quad gyr_z(k) \,]^T;$$

$$v\_1(k) = [\, acc_x(k) \quad acc_y(k) \quad acc_z(k) \,]^T;$$

$$v\_2(k) = [\, mag_x(k) \quad mag_y(k) \quad mag_z(k) \,]^T;$$

$$v\_i(k) = [\, v\_i_x(k) \quad v\_i_y(k) \quad v\_i_z(k) \,]^T; \text{ for } i = 4, 5, \ldots , n;$$

Moreover, if the localization apparatus includes an odometer, the following vectors are padded:

$$vel(k) = [\, vel_x(k) \quad vel_y(k) \quad vel_z(k) \,]^T;$$

If there is no odometer, the accelerometer may be used to measure and compute the translational velocity; when the translational velocity measurement is absent, computation may be performed as below: firstly, the gravitational acceleration is computed from the accelerometer:

$$a\_bdy(k) = acc(k) - (R\_est(k))^T g;$$

then, by using numerical integration method, for example, trapezoidal rule, the velocity of the sensor reference system is computed:

$$vel(k) = vel(k) + \frac{a\_bdy(k-1) + a\_bdy(k)}{2} T_s;$$

where T_s is a constant sampling period in the unit of second. In this process, it is required to estimate the current direction R_est(k). Therefore, the velocity computed this way will include a bias before R_est(k)→R(k) is converged. But this method considers the bias estimation, for example, when the velocity measurement is from the odometer with bias. The velocity computed by the accelerometer and the velocity computed by the odometer both can be used in this method.

With continuous reference to FIG. 1, in the step S3, after the data acquisition stage is completed, the additional inertial vector can be computed. Because at least three inertial vectors are needed, the third inertial vector of the moment k can be computed based on the measurement values of the accelerometer and the magnetometer as below:

$$v\_3(k) = [ \, (v\_1(k) \times v\_2(k))_x \quad (v\_1(k) \times v\_2(k))_y \quad (v\_1(k) \times v\_2(k))_z \, ]^T$$

and all inertial vectors must be normalized into unit vectors in the following way:

$$v\_i = \left[ \, \frac{v\_i_x}{\|v\_i\|} \quad \frac{v\_i_y}{\|v\_i\|} \quad \frac{v\_i_z}{\|v\_i\|} \, \right]^T ; \text{ for } i = 1, 2, \ldots, n.$$

With continuous reference to FIG. 1, the alignment error is a vector representing a direction error between the actual inertial vector and its estimation value. In the step S3, the alignment error can be obtained in the following formula:

$$z(k) = \sum_{i=1}^{n} k\_i(v\_i(k)) \times \left( (R\_est(k))^T r\_i(k) \right).$$

With continuous reference to FIG. 1, in the step S3, the method considers the filter stage of the inertial vector measurement where the first-order linear filter is used as below:

$$vpf\_i(k) = gm\_f(v\_i(k) - vf\_i(k)), \text{ for } i = 1, 2, \ldots, n;$$

Then, by using the numerical integration method (for example, by trapezoidal rule), the filter version of the inertial vector is obtained:

$$vf\_i(k) = vf\_i(k) + \frac{vpf\_i(k-1) + vpf\_i(k)}{2} T_s$$

Therefore, by selecting the gain gm_f mentioned above, the condition $\|v\_i(k) - vf\_i(k)\| < \epsilon_f$ can be satisfied.

With continuous reference to FIG. 1, in the step S3, the pre-bias estimation process includes computing the necessary variables for bias estimation. Firstly, the following variables are obtained:

$$K\_f(k) = -\sum_{i=1}^{n} k\_i \begin{bmatrix} 0.0 & -(vf\_i(k))_z & (vf\_i(k))_y \\ (vf\_i(k))_z & 0.0 & -(vf\_i(k))_x \\ -(vf\_i(k))_y & (vf\_i(k))_x & 0.0 \end{bmatrix} \begin{bmatrix} 0.0 & -(v\_i(k))_z & (v\_i(k))_y \\ (v\_i(k))_z & 0.0 & -(v\_i(k))_x \\ -(v\_i(k))_y & (v\_i(k))_x & 0.0 \end{bmatrix}$$

$$v\_aux(k) = k\_w(gm\_f) \sum_{i=1}^{n} k\_i(vf\_i(k)) \times v\_i(k);$$

Then, the dynamic computation for the pre-bias estimation value of the moment k is performed as below:

$$bwbp(k) = k\_wK\_f(k)(gyr(k) - bw\_est(k)) + v\_aux(k) - z(k);$$

$$bvbp(k) = k\_v(vel(k) - bv\_est(k)) -$$

$$k\_v(w\_est(k)) \times \left( (R\_est(k))^T p(k) \right) + (R\_est(k))^T (p\_est(k) - p(k));$$

The pre-bias estimation value is obtained by using the previous dynamic numerical integration and then computed based on the trapezoidal rule, with the result below:

$$bwb(k) = bwb(k) + \frac{bwbp(k-1) + bwbp(k)}{2} T_s;$$

$$bvb(k) = bvb(k) + \frac{bvbp(k-1) + bvbp(k)}{2} T_s;$$

The current estimation algorithm uses the following bias estimation value:

$$bw\_est(k) = bwb(k) + k\_w \sum_{i=1}^{n} k\_i(vf\_i(k)) \times v\_i(k);$$

$$bv\_est(k) = bvb(k) - k\_v(R\_est(k))^T p(k).$$

With continuous reference to FIG. 1, in the step S3, the velocity estimation value is computed in two parts. First, the velocity estimation value is computed as follows:

$$w\_est(k) = (k\_z)z(k) + gyr(k) - bw\_est(k);$$

$$v\_est(k) = -k\_p(R\_est(k))^T (p\_est(k) - p(k)) -$$

$$k\_z\left( (R\_est(k))^T p\_est(k) \right) \times z(k) + vel(k) - bv\_est(k);$$

then, the velocity estimation value transmitted to HMI is shown as below:

$$wb\_est(k) = gyr(k) - bw\_est(k);$$

$$vb\_est(k) = vel(k) - bv\_est(k);$$

where the signal-to-noise ratio is usually higher than the signal-to-noise ratio of the estimation values w_est(k) and v_est(k).

With continuous reference to FIG. 1, in the step S3, when the pose estimation value is computed, the following auxiliary matrix is required:

$$V\_est(k) = \begin{bmatrix} 0.0 & -(\text{w\_est}(k))_z & (\text{w\_est}(k))_y & (\text{v\_est}(k))_x \\ (\text{w\_est}(k))_z & 0.0 & -(\text{w\_est}(k))_x & (\text{v\_est}(k))_y \\ -(\text{w\_est}(k))_y & (\text{w\_est}(k))_x & 0.0 & (\text{v\_est}(k))_z \\ & 0.0_{1\times 3} & & 0.0 \end{bmatrix}$$

In this case, computation is performed using the following matrix multiplication method:

$$gp\_est(k) = g\_est(k)V\_est(k);$$

Therefore, the pose estimation value is obtained by using the numerical integration method:

$$g\_est(k) = g\_est(k) + \frac{gp\_est(k-1) + gp\_est(k)}{2}T_s;$$

It is noted that the integral is computed for each element of the 4×4 matrix gp_est(k), where, the last row of the matrix gp_est(k) may be omitted because it does not include the pose estimation information.

The output of the computation process of the pose estimation value is the direction estimation value and the position estimation value determined in the following way:

$$R\_est(k) = g\_est(k).\,[1:3,1:3]$$

$$p\_est(k) = g\_est(k).\,[1:3,4];$$

where the symbol A(k)·[rows,columns] represents extracting the row and column of the matrix A at the moment k and the symbol n refers to a sequence from the n-th row/column to the m-th row/column.

With continuous reference to FIG. 1 in order to ensure the direction matrix R_est(k) maintains the orthogonality condition, before the direction estimation value is transmitted to the HMI, it is required to perform orthogonalization process based on an algorithm, for example, based on the most famous orthogonalization method Gram-Schmidt algorithm. But, other methods may also be applied to increase the computation efficiency.

At last, the state estimation values of the moment k are as follows:

$$wb\_est(k);$$

$$vb\_est(k);$$

$$R\_est(k);$$

$$p\_est(k).$$

With continuous reference to FIG. 1, the update rule of the state estimation values is as follows:

$$\frac{d}{dt}\hat{g} = \hat{g}\hat{V};$$

where,

-continued $$g = \begin{bmatrix} \hat{R} & \hat{p} \\ 0_{1\times 3} & 1 \end{bmatrix};$$

$$V = \begin{bmatrix} 0 & -\hat{\Omega}_z & \hat{\Omega}_y & \hat{v}_z \\ \hat{\Omega}_z & 0 & -\hat{\Omega}_x & \hat{v}_y \\ -\hat{\Omega}_y & \hat{\Omega}_x & 0 & \hat{v}_z \\ & 0_{1\times 3} & & 0 \end{bmatrix};$$

$$\hat{\Omega} = k_z z + \Omega_m - \hat{b}_w;$$

$$\hat{v} = -k_p \hat{R}^T(\hat{p} - p_m) - k_z\left(\hat{R}^T\hat{p}\right)\times z + v_m - \hat{b}_v;$$

$$\hat{b}_w = \bar{b}_w + k_w \sum_{i=1}^n k_i y_{f,i} \times y_i;$$

$$\hat{b}_v = \bar{b}_v - k_v \hat{R}^T p_m;$$

$$\frac{d}{dt}\bar{b}_w = k_w K_f\left(\Omega_m - \hat{b}_w\right) - z + k_w \gamma_f \sum_{i=1}^n k_i y_{f,i} \times y_i;$$

$$\frac{d}{dt}\bar{b}_v = k_v\left(v_m - \hat{b}_v\right) - k_v\hat{\Omega}\times\left(\hat{R}^T p_m\right) + \hat{R}^T(\hat{p} - p_m);$$

$$z = \sum_{i=1}^n k_i y_i \times\left(\hat{R}^T r_i\right);$$

$$\frac{d}{dt}y_{f,i} = \gamma_f(y_i - y_{f,i}), \text{ for } i = 1,2,\dots,n;$$

$$K_f = -\sum_{i=1}^n k_i \begin{bmatrix} 0 & -(y_{f,i})_z & (y_{f,i})_y \\ (y_{f,i})_z & 0 & -(y_{f,i})_x \\ -(y_{f,i})_y & (y_{f,i})_x & 0 \end{bmatrix}\begin{bmatrix} 0 & -(y_i)_z & (y_i)_y \\ (y_i)_z & 0 & -(y_i)_x \\ -(y_i)_y & (y_i)_x & 0 \end{bmatrix};$$

where $p_m = [p_x\ p_y\ p_z]^T$ and $v_m = [v_x\ v_y\ y_z]^T$ are a position and a translational velocity measured by the localization apparatus respectively, $2m = [\Omega_x\ \Omega_y\ \Omega_z]^T$ is an angular velocity measured by the gyro of the IMU, the vector $y_i = [(y_i)_x\ (y_i)_y\ (y_i)_z]^T$, for i=1, 2, ..., n, and also includes the inertial vectors of the accelerometer and the magnetometer of the IMU, which are already normalized; finally, the velocity estimation value is computed as below:

$$\hat{\Omega} = \Omega_m - \hat{b}_w;$$

$$\hat{v} = \Omega_m - \hat{b}_v.$$

In the descriptions of the present disclosure, the descriptions made by referring to the terms such as "one embodiment", "some embodiments", "in the present embodiment", "specific example", "some examples" and the like are meant to refer to that the specific features, mechanisms, materials or characteristics described in combination with the embodiments or examples are included in at least one embodiment or example of the present disclosure. In the specification, the illustrative expressions of the above terms are not necessarily directed to the same embodiments or examples. Furthermore, the described specific features, mechanisms, materials or characteristics may be combined in any way in one or more embodiments or examples. Besides, in case of no conflicts, those skilled in the arts can perform combination on different embodiments or examples and the features in different embodiments or examples in the specification.

The above descriptions are only about the specific embodiments of the present disclosure and the scope of protection of the present disclosure is not limited thereto. Any changes or substitutions easily conceived of by those skilled in the arts within the technical scope of the present disclosure shall be encompassed in the scope of protection of the present disclosure. Therefore, the scope of protection of the present disclosure should be indicated by the appended claims.

The invention claimed is:

1. A state estimation method for mobile robot navigation, wherein the method is to mount and fix an inertial measurement unit and a localization apparatus on a mobile robot in advance, and the mobile robot is configured in advance with a field-programmable gate array, an application-specific integrated circuit and a processing module; the field-programmable gate array is respectively in communication with the inertial measurement unit and the localization apparatus; the application-specific integrated circuit is respectively in communication with the field-programmable gate array and the processing module; and the processing module is in communication with a human-machine interface, and the state estimation method further includes the following steps:

at step S1, initializing the processing module, and then controlling the field-programmable gate array to obtain measurement values of a moment k collected by the inertial measurement unit and the localization apparatus in a constant sampling period;

at step S2, controlling the application-specific integrated circuit to send the measurement values to the processing module;

at step S3, controlling the processing module to, based on the measurement values, sequentially perform vector padding, additional inertial vector acquisition, normalization processing, alignment error computation, filter measurement value computation, bias estimation value computation, velocity estimation value computation, pose estimation value computation and orthogonalization processing to obtain state estimation values of the moment k;

at step S4, controlling the processing module to send the state estimation values to the human-machine interface for visual display.

2. The state estimation method for mobile robot navigation of claim 1, wherein in the step S3, the performing vector padding includes the following steps: padding the following vectors based on the measurement values of the moment k:

$$p(k) = [\ p_x(k) \quad p_y(k) \quad p_z(k)\ ]^T$$

$$gyr(k) = [\ gyr_x(k) \quad gyr_y(k) \quad gyr_z(k)\ ]^T$$

$$v\_1(k) = [\ acc_x(k) \quad acc_y(k) \quad acc_z(k)\ ]^T$$

$$v\_2(k) = [\ mag_x(k) \quad mag_y(k) \quad mag_z(k)\ ]^T$$

$$v\_i(k) = [\ v\_i_x(k) \quad v\_i_y(k) \quad v\_i_z(k)\ ]^T; \text{for } i = 4,5, \dots , n$$

determining whether an odometer is present in the localization apparatus;

if yes, padding the following vectors:

$$vel(k) = [\ vel_x(k) \quad vel_y(k) \quad vel_z(k)\ ]^T$$

if not, by using an accelerometer, measuring and computing the translational velocity and padding the following vectors:

$$vel(k) = vel(k) + \frac{a\_bdy(k-1) + a\_bdy(k)}{2} T_s$$

-continued $$a\_bdy(k) = acc(k) - (R\_est(k))^T g$$

where p(k), gyr(k), vel(k) and acc(k) represent the vectors of the inertial measurement unit and the localization apparatus at the moment k, v_i(k) represents the inertial vector of the moment k, v_1(k) represents a first inertial vector of the moment k, v_2(k) represents a second inertial vector of the moment k, R_est(k) represents a direction estimation value of the moment k, and $T_s$ represents the constant sampling period.

3. The state estimation method for mobile robot navigation of claim 2, wherein the step S3 of obtaining the additional inertial vector includes the following steps:

padding a third inertial vector of the moment k, where the third inertial vector is represented by:

$$v\_3(k) = \left[\ (v\_1(k) \times v\_2(k))_x \quad (v\_1(k) \times v\_2(k))_y \quad (v\_1(k) \times v\_2(k))_z\ \right]^T.$$

4. The state estimation method for mobile robot navigation of claim 3, wherein the step S3 of performing normalization processing in the following formula:

$$v\_i = \left[\ \frac{v\_i_x}{\|v\_i\|} \quad \frac{v\_i_y}{\|v\_i\|} \quad \frac{v\_i_z}{\|v\_i\|}\ \right]^T; \text{for } i = 1, 2, \dots , n$$

where v_i represents an after-normalization vector.

5. The state estimation method for mobile robot navigation of claim 4, wherein the step S3 of performing alignment error computation in the following formula:

$$z(k) = \sum_{i=1}^{n} k\_i(v\_i(k)) \times \left((R\_est(k))^T r\_i(k)\right)$$

where z(k) represents an alignment error, k_i represents a scalar gain, ranging between 0 and 1, and r_i(k) represents a pre-obtained inertial reference vector of the moment k.

6. The state estimation method for mobile robot navigation of claim 5, wherein the step S3 of computing the filter measurement value in includes the following steps:

introducing a first-order linear filter, where the first-order linear filter is expressed as below:

$$vpf\_i(k) = gm\_f(v\_i(k) - vf\_i(k)), \text{for } i = 1, 2, \dots , n$$

then, by using numerical integration method, obtaining a filter version of each inertial vector:

$$vf\_i(k) = vf\_i(k) + \frac{vpf\_i(k-1) + vpf\_i(k)}{2} T_s$$

where vf_i(k) represents the filter version of each inertial vector at the moment k, and gm_f represents a gain of the first-order linear filter.

7. The state estimation method for mobile robot navigation of claim 6, wherein the step S3 of computing the bias estimation value in includes the following steps:

computing a necessary variable for bias estimation:

$$K\_f(k) = -\sum_{i=1}^{n} k\_i \begin{bmatrix} 0.0 & -(vf\_i(k))_z & (vf\_i(k))_y \\ (vf\_i(k))_z & 0.0 & -(vf\_i(k))_x \\ -(vf\_i(k))_y & (vf\_i(k))_x & 0.0 \end{bmatrix}$$

$$\begin{bmatrix} 0.0 & -(v\_i(k))_z & (v\_i(k))_y \\ (v\_i(k))_z & 0.0 & -(v\_i(k))_x \\ -(v\_i(k))_y & (v\_i(k))_x & 0.0 \end{bmatrix}$$

$$v\_aux(k) = k\_w(gm\_f)\sum_{i=1}^{n} k\_i(vf\_i(k)) \times v\_i(k)$$

where k_w represents a preset design parameter corresponding to the angular velocity error;

then, performing dynamic computation on pre-bias estimation value of the moment k:

$$bwbp(k) = k\_wK\_f(k)(gyr(k) - bw\_est(k)) + v\_aux(k) - z(k)$$

$$bvbp(k) = k\_v(vel(k) - bv\_est(k)) - k\_v(w\_est(k)) \times \left((R\_est(k))^T p(k)\right) +$$

$$(R\_est(k))^T (p\_est(k) - p(k))$$

where k_v represents a preset design parameter corresponding to the translational velocity, bwbp(k) and bvbp(k) represent auxiliary variables at the moment k, p_est(k) represents a position estimation value of the moment k, and w_est(k) represents the angular velocity estimation value of the moment k;

then, based on trapezoidal rule, obtaining by computation:

$$bwb(k) = bwb(k) + \frac{bwbp(k-1) + bwbp(k)}{2}T_s$$

$$bvb(k) = bvb(k) + \frac{bvbp(k-1) + bvbp(k)}{2}T_s$$

then, performing computation on the bias estimation value:

$$bw\_est(k) = bwb(k) + k\_w\sum_{i=1}^{n} k\_i(vf\_i(k)) \times v\_i(k)$$

$$bv\_est(k) = bvb(k) - k\_v(R\_est(k))^T p(k)$$

where bw_est(k) represents the bias estimation value corresponding to the angular velocity at the moment k, and bv_est(k) represents the bias estimation value corresponding to the translational velocity at the moment k.

8. The state estimation method for mobile robot navigation of claim 7, wherein the step S3 of performing computation on the velocity estimation value includes the following steps:

computing the velocity estimation value:

$$w\_est(k) = (k\_z)z(k) + gyr(k) - bw\_est(k)$$

$$v\_est(k) = -k\_p(R\_est(k))^T (p\_est(k) - p(k)) -$$

-continued $$k\_z\left((R\_est(k))^T p\_est(k)\right) \times z(k) + vel(k) - bv\_est(k)$$

where k_z represents a preset design parameter corresponding to the direction, v_est(k) represents a translational velocity estimation value of the moment k, k_p represents a preset design parameter corresponding to the position;

then, performing computation on the velocity estimation value transmitted to the human-machine interface:

$$wb\_est(k) = gyr(k) - bw\_est(k)$$

$$vb\_est(k) = vel(k) - bv\_est(k)$$

where wb_est(k) represents the angular velocity estimation value transmitted to the human-machine interface, and vb_est(k) represents the translational velocity estimation value transmitted to the human-machine interface.

9. The state estimation method for mobile robot navigation of claim 8, wherein the step S3 of performing computation on the pose estimation value includes the following steps:

establishing an auxiliary matrix:

$$V\_est(k) = \begin{bmatrix} 0.0 & -(w\_est(k))_z & (w\_est(k))_y & (v\_est(k))_x \\ (w\_est(k))_z & 0.0 & -(w\_est(k))_x & (v\_est(k))_y \\ -(w\_est(k))_y & (w\_est(k))_x & 0.0 & (v\_est(k))_z \end{bmatrix}$$

then, performing matrix multiplication computation:

$$gp\_est(k) = g\_est(k)V\_est(k)$$

then, by numerical integration method, obtaining the pose estimation value by computation:

$$g\_est(k) = g\_est(k) + \frac{gp\_est(k-1) + gp\_est(k)}{2}T_s$$

where g_est(k) represents the pose estimation value;

then, performing computation on the direction estimation value and the position estimation value:

$$R\_est(k) = g\_est(k) \cdot [1{:}3, 1{:}3]$$

$$p\_est(k) = g\_est(k) \cdot [1{:}3, 4].$$

10. The state estimation method for mobile robot navigation of claim 9, wherein the step S3 of performing orthogonalization processing includes:

before the direction estimation value is transmitted to the human-machine interface, performing orthogonalization process to enable the matrix of the direction estimation values to have orthogonality condition, then, using the angular velocity estimation value wb_est(k), the translational velocity estimation value vb_est(k), the direction estimation value R_est(k), and the position estimation value p_est(k) at the moment k as the state estimation values.

* * * * *